United States Patent Office

2,916,487
Patented Dec. 8, 1959

2,916,487

NEW THIAZOLE BASE AND CYANINE DYES PREPARED THEREFROM

George de Stevens, Portland, Conn., assignor to Sperry Rand Corporation, New York, N.Y., a corporation of Delaware No Drawing. Application August 22, 1955
Serial No. 529,962

13 Claims. (Cl. 260—240.4)

This invention relates to cynanine dyes containing a 5,6,7,8-tetrahydro-4-cyclohepta thiazole nucleus and to processes for preparing such dyes.

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain.

I have now found that it is possible to prepare cyanine dyes in which one or both of the above mentioned auxochromic nitrogen atoms lie in a 5,6,7,8-tetrahydro-4-cyclohepta thiazole nucleus. I have further found that these new cyanine dyes sensitize photographic emulsions strongly and cleanly, i.e. without producing excessive fog or residual dye stain.

It is accordingly an object of my invention to provide new cyanine dyes. A further object is to provide photographic emulsions sensitized with such dyes. Other objects will appear hereinafter.

As starting material for the preparation of my new dyes I employ 2-alkyl-5,6,7,8-tetrahydro-4-cyclohepta thiazole, particularly 2-methyl-5,6,7,8-tetrahydro-4-cyclohepta thiazole. I first convert the 2-alkyl-5,6,7,8-tetrahydro-4-cyclohepta thiazole to quaternary salts by reacting the base with esters, such as alkyl halides, alkyl sulfates, or alkyl-p-toluene sulfonates, for example. For purposes of convenience the quaternary salts useful in practicing this invention can be represented by the following single formula:

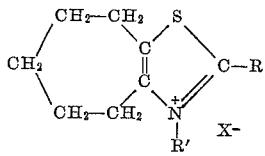

wherein R' represents an alkyl group, e.g. methyl, ethyl, n-propyl, isobutyl, n-butyl, β-hydroxy ethyl, β-methoxyethyl, β-ethoxyethyl, β-acetoxy ethyl, β-carboxy ethyl, carboxy methyl, β-carbomethoxyethyl, β-carbethoxyethyl, allyl, etc. or an aralkyl group, e.g. benzyl, phenyl, ethyl, etc., R represents methyl, ethyl or n-propyl and X⁻ represents an anion, e.g. chloride, bromide, iodide, benzene sulfonate, p-toluene sulfonate, methyl sulfate, ethyl sulfate, thiocyanate, perchlorate, acetate, etc.

To prepare pseudocyanine dyes from such quaternary salts I react the quaternary salts with α-halogenoquinoline quaternary salts, in the presence of an acid binding agent, such for example, as sodium ethylate, sodium carbonate, pyridine or a strong organic base (e.g. triethyl amine, trimethylamine and N-methyl piperidine). I have found it advantageous to employ a mixture of pyridine with a strong tertiary organic base.

Instead of 2-halogenoquinoline quaternary salts I can employ 2-alkyl mercapto or 2-aryl mercapto quinoline quaternary salts to condense with the quaternary salts of 2-alkyl-5,6,7,8-tetrahydro-4-cyclohepta thiazole in the presence of an acid binding agent.

Using 2-halogeno pyridine quaternary salts instead of 2-halogeno quinoline quaternary salts I can prepare pyrido-cyanine dyes containing a 5,6,7,8-tetrahydro-4-cyclohepta thiazole nucleus.

Using 2-alkyl mercapto or 2-aryl mercapto benzothiazole or naphtho thiazole salts I can prepare simple cyanine dyes other than pseudocyanine dyes.

To prepare symmetrical carbocyanine dyes from 2-alkyl-5,6,7,8-tetrahydro-4-cyclohepta thiazole quaternary salts, I react the quaternary salts with esters of ortho acids, e.g. ethyl ortho formate, ethyl ortho acetate, ethyl orthopropionate and ethyl ortho benzoate in the presence of pyridine or a mixture of pyridine and triethyl amine.

To prepare unsymmetrical carbocyanine dyes from 2-alkyl-5,6,7,8-tetrahydro-4-cyclohepta thiazole quaternary salts I react the quaternary salts with cycloammonium quaternary salts containing a β-aryl aminovinyl group in the alpha or gamma position, i.e. in one of the so-called reactive positions in the presence of an acid binding agent, e.g. pyridine or pyridine plus triethyl amine.

To prepare styryl dyes from my new quaternary salts I condense them with p-dialkyl aminobenzaldehyde in the presence of an alkaline catalyst, e.g. piperidine in absolute ethanol solution.

To prepare merocarbocyanine dyes from 2-alkyl-5,6,7,8-tetrahydro-4-cyclohepta thiazole quaternary salts I condense the quaternary salts with ketomethylene heterocyclic intermediates containing an aryl aminomethylene group in the 5-position in the presence of an acid binding agent, e.g. pyridine plus triethyl amine. Examples of such ketomethylene intermediates are 5-acetanilido methylene-3-ethyl rhodanine, 5-acetanilidomethylene-3-ethyl-1-phenyl-2-thiohydantoin, etc.

To sensitize photographic silver halide emulsions with my new dyes, I disperse the dyes in the emulsions. My invention is particularly directed to the customarily employed gelatino-silver-halide emulsions, such as the gelatino-silver-bromide, bromiodide, chloride and chlorobromide for example. The methods of incorporating dyes in emulsions are simple and well known to those skilled in the art and described in various patents and publications, for example, U.S. Patent 2,336,843, patented Dec. 14, 1943.

My invention consists of the synthesis of a new thiazole compound, 2-methyl 5,6,7,8 - tetrahydro - 4 - cyclohepta thiazole I.

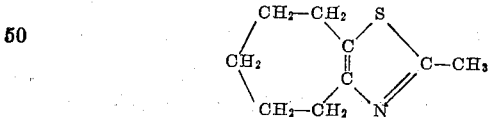

This heterocyclic compound is prepared by treating the enol form of 2-chloro cycloheptanone (Kotz Ann., 400, 53 (1940)) II with thioacetamide.

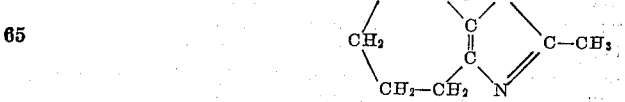

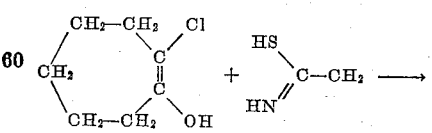

I have also discovered that cyanine dyes can be prepared from quaternary salts of this thiazole.

The following examples will serve to demonstrate the manner of preparation of my new base, quaternary salts and dyes. These examples are not, however, intended to limit my invention.

*Example I.—2-methyl-5,6,7,8-tetrahydro-4-cyclohepta thiazole*

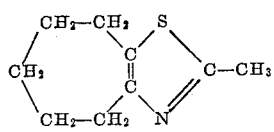

A mixture of 10 g. (0.067 moles) of α-chloro cycloheptanone and 6 g. (0.067 mole +10% excess) of thioacetamide was heated slowly up to 85° C. whereupon a vigorous reaction commenced. The temperature rose of itself to 125° C. and was maintained there with external cooling. The reaction temperature was maintained at 125° C. for ten min. The mixture was then heated on the steam bath for one and one-half hours. To the chilled reaction mixture was added 100 cc. of 10% hydrobromic acid solution and the resulting solution was thoroughly extracted with ether. The acid solution was made alkaline with ammonium hydroxide. An oil separated out and the two phase mixture was thoroughly extracted with ether. The ether extract was dried over $K_2CO_3$. The ether was evaporated off and the residue was distilled at reduced pressure. The desired thiazole was obtained in 36% yield, B.P. 115°–120°/16 mm.

*Example II. — 2-methyl-5,6,7,8-tetrahydro-4-cycloheptathiazole ethiodide*

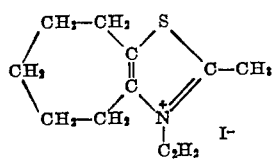

4.0 g. (1 mol.) 2-methyl-5,6,7,8-tetrahydro-4-cycloheptathiazole and 4.0 g. (1 mol. +20% excess) of ethyl iodide were refluxed for four hours. At the end of this time quaternarization appeared to be complete. The chilled viscous material was washed well with ether. Since this substance resisted all attempts to crystallization, it was used as such for dye synthesis. The yield of viscous quaternary salt was 70% of theoretical.

*Example III.—3,3'-diethyl-5,6,7,8,5',6',7',8'-octa hydro-4,4'-dicycloheptathiazolo carbocyanine iodide*

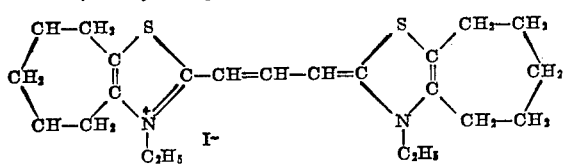

1.8 g. (1 mol.) of 2-methyl-5,6,7,8-tetrahydro-4-cycloheptathiazole ethiodide, 0.73 g. (1 mol. +25% excess) of diethoxy methyl acetate, 15 cc. of pyridine and 1.0 g. of triethylamine were refluxed for 90 minutes. After chilling, 400 cc. of ether was added to the dye solution and thus triturated. After decanting the ether, the reddish purple vicous residue was washed several times with fresh portions of ether. The viscous residue was dissolved in 5 cc. of acetone and to this solution was added 10 cc. of water. After chilling, the precipitate was collected on a filter and washed well with water. The solid material was dissolved in 2 cc. of acetone and chilled. The dye crystals were collected at the pump and washed with cold acetone. The yield of crude dye was 10% of theoretical. After two recrystallizations from acetone (20 cc. per gram), the yield of pure dye obtained as green crystals with a bronze reflex was 7% of theoretical, M.P. 208°210° C. with decomposition. A methanol solution of the dye was reddish purple and had an absorption maximum at 566 mu.

*Example IV.—3,3'-diethyl-5',6',7',8'-tetrahydro-4'-cyclohepta oxa thiazolo carbocyanine iodide*

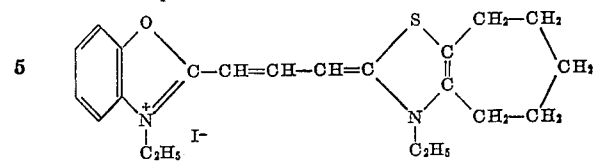

1.0 g. (1 mol.) of 2-methyl-5,6,7,8-tetrahydro-4-cyclohepta thiazole ethiodide, 1.32 g. (1 mol.) of 2-β-acetanilido vinyl benzoxazole ethiodide 10 cc. of absolute ethyl alcohol and 0.5 g. of triethyl amine were refluxed for 10 minutes. After chilling overnight, the dye crystals were collected on a Buchner funnel, washed well with water, then acetone and air dried. Two recrystallizations from methanol (25 cc. per gram) yielded a 13% yield of pure dye in the form of dark purple crystals having a blue reflex and melting at 236°–238° C. with decomposition. A methanol solution of the dye was orange-red in color and had an absorption maximum at 516 mu.

*Example V.—3-ethyl-5-[(3-ethyl-(2,3)5,6,7,8-tetrahydro-4-cyclohepta thiazolylidene) ethylidene] rhodanine*

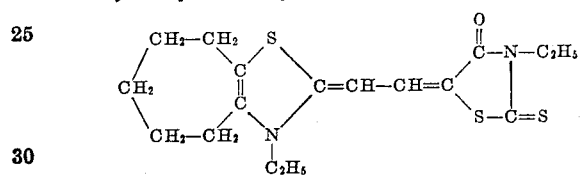

0.64 g. (1 mol.) of 2-methyl-5,6,7,8-tetrahydro-4-cycloheptathiazole ethiodide, 0.60 g. (1 mol.) of 5-acetanilido methylene-3-ethyl rhodanine, 10 cc. of pyridine and 0.5 g. of triethylamine were refluxed 20 minutes. After cooling to room temperature, 75 cc. of water was added to the dye solution whereupon the dye separated out. The crystals were collected on a filter, washed well with water than methanol and air dried. The yield of crude dye was 75% of theoretical and after two recrystallizations from methanol (200 cc. per gram), a 70% yield of pure dye was obtained. The pure dye was obtained in the form of shiny green needles and melting at 190°–192° C. with decomposition. A methanol solution of the dye was red with an absorption maximum at 550 mu.

*Example VI. — 1',3-diethyl-5,6,7,8-tetrahydro-4-cyclohepta thiazole-2'-cyanine iodide*

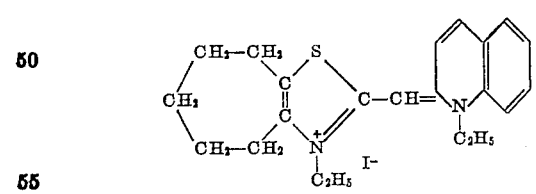

0.62 g. (1 mol.) of 2-methyl-5,6,7,8-tetrahydro-4-cyclohepta thiazole ethiodide, 12 cc. of absolute ethyl alcohol and 0.8 g. of triethylamine were refluxed 15 minutes. Upon chilling, a copious precipitate of dye was obtained which was collected on a filter, washed well with water, then acetone and air dried. After two recrystallizations from methanol (30 cc. per gram), a 65% yield of pure dye was obtained in the form of bright red tiny needles and melting at 263°–265° C. with decomposition. A methanol solution of the dye was yellowish orange with an absorption maximum at 476 mu.

*Example VII.—2-p-dimethyl aminostyryl-5,6,7,8-tetrahydro-4-cyclohepta thiazole ethiodide*

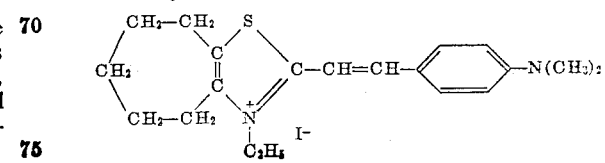

0.62 g. (1 mol.) of 2-methyl-5,6,7,8-tetrahydro-4-cyclohepta thiazole ethiodide, 0.30 g. (1 mol.) of p-dimethyl aminobenzaldehyde, 10 cc. of absolute ethyl alcohol and 2 drops of piperidine were refluxed 70 minutes. After chilling overnight, the precipitate was collected on a filter, washed well with water, then acetone and air dried. The yield of crude dye was 17% of theoretical which, after two recrystallizations from methanol (30 cc. per gram) gave an 11% yield of pure dye in the form of tiny orange needles. The pure dye melted at 238°–240° with decomposition. A methanol solution of the dye was yellowish orange with an absorption maximum at 476 mu.

It is well known that cyanine dyes resonate between two extreme forms and that a cyanine dye can be represented by either of the two extreme forms. Thus, the unsymmetrical type of instant dyes can be represented by either of the following formulas.

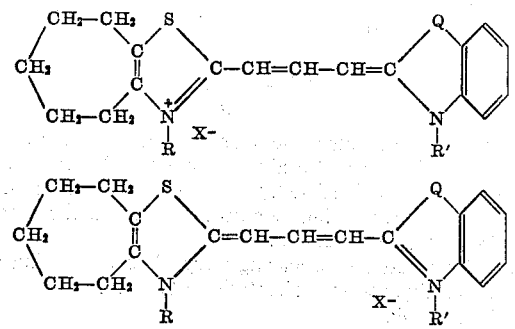

The features of novelty which I believe to be characteristic of my invention are set forth with particularity in the following claims. It should be understood, however, that modifications and changes may be made, without departing from the spirit and substance of my invention, as will be apparent to those skilled in the art.

What I claim as my invention and desire to be secured by Letters Patent of the United States is:

1. A dye selected from the group characterized by the following general formula

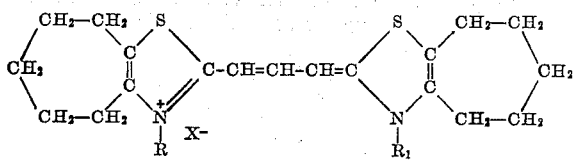

where R and R' respectively represent members selected from the group consisting of alkyl and aralkyl groups, and X⁻ represents an acid radical.

2. 3,3'-diethyl-5,6,7,8,5',6',7',8'-octahydro-4,4'-dicycloheptathiazolo carbocyanine iodide having the following structure

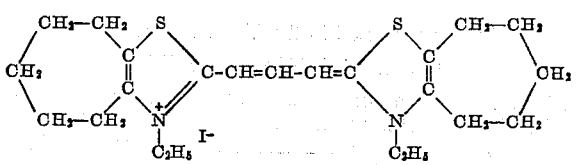

3. A dye selected from the group characterized by the following general formula

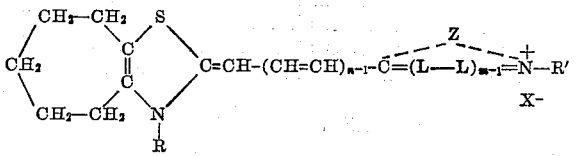

where R and R' respectively represent members selected from the group consisting of alkyl and aralkyl groups, m represents a positive integer from 1 to 2, n represents a positive integer from 1 to 3, L represents a methine group, X represents an acid radical and Z represents the non-metallic atoms necessary to complete a heterocyclic nucleus containing from 5 to 6 atoms in the heterocyclic ring, said heterocyclic nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series.

4. 3,3'-diethyl-5',6',7',8'-tetrahydro-4'-cyclohepta oxathiazolo carbocyanine iodide

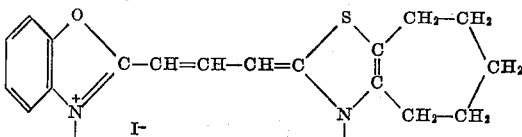

5. 1',3-diethyl-5,6,7,8-tetrahydro-4-cyclohepta thiazolo-2'-cyanine iodide

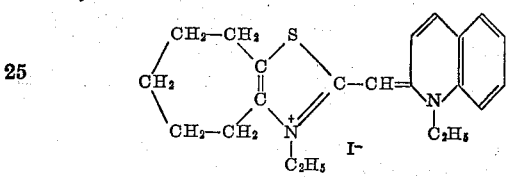

6. A dye selected from the group characterized by the following general formula

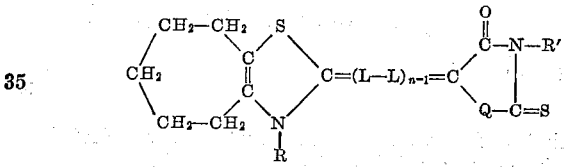

where R is a member selected from the group consisting of alkyl and aralkyl groups, R' is a member selected from the group consisting of alkyl, aralkyl, and aryl groups, L is a methine group, n is a positive integer of from 1 to 4 and Q is a member selected from the group consisting of oxygen, sulfur, selenium and =N-R'.

7. 3-ethyl-5-[(3-ethyl-2(3)5,6,7,8 - tetrahydro-4-cyclohepta thiazolylidene) ethylidene] rhodanine having the structure

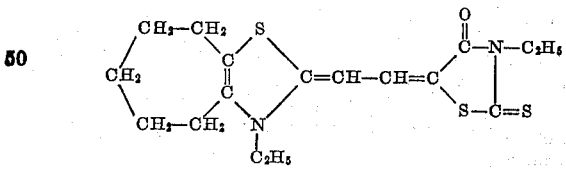

8. A dye selected from the group characterized by the following general formula

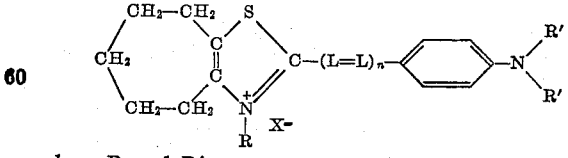

where R and R' represent a member selected from the group consisting of alkyl and aralkyl groups, L represents a methine group, n is a positive integer from one to two, and X⁻ represents an acid radical.

9. 2-p-dimethyl aminostyryl-5,6,7,8-tetrahydro-4-cyclohepta thiazole ethiodide having the following structure

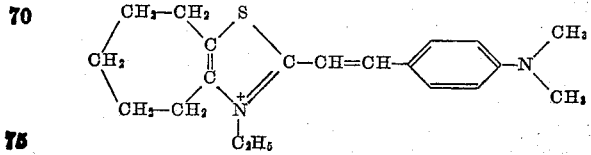

10. A process for preparing symmetrical carbocyanine dyes having the general formula

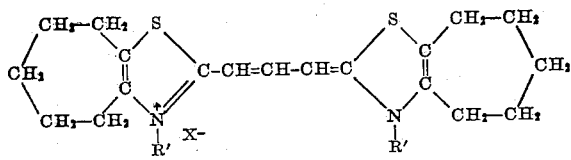

wherein R and R' respectively represent members selected from the group consisting of alkyl and aralkyl groups, and X⁻ represents an acid radical from a quaternary salt having the general formula

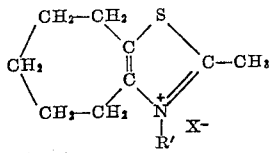

where R' and X⁻ have their previous significance comprising condensing the quaternary salt with an ester of an orthocarboxylic acid in an alkaline medium containing at least one constituent selected from the group consisting of pyridine and a mixture of pyridine and triethylamine.

11. A process for preparing unsymmetrical cyanine dyes having the general formula

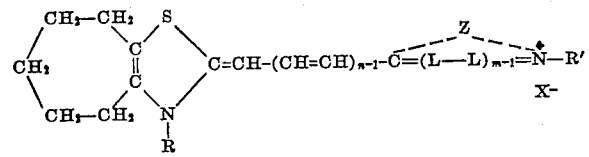

wherein R and R' respectively represent members selected from the group consisting of alkyl and aralkyl groups, $m$ represents a positive integer from 1 to 2, $n$ represents a positive integer from 1 to 3, L represents a methine group, X represents an acid radical and Z represents the non-metallic atoms necessary to complete a heterocyclic nucleus containing from 5 to 6 atoms in the heterocyclic ring, said heterocyclic nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series and a nucleus of the 3,3-dialkyl indolenine series from the quaternary salt having the general formula

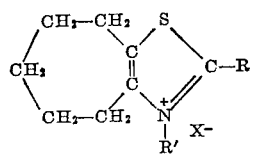

where R represents an alkyl radical $C_NH_{2N+1}$ in which N is a positive integer of from 1 to 3, R' represents a member selected from the group consisting of alkyl and aralkyl groups, and X represents an acid radical comprising condensing said quaternary salt with a heterocyclic ammonium quaternary salt having a reactive constituent selected from the group consisting of aryl aminovinyl groups, aryl aminobutudienyl groups, halogen atoms, and thioether groups in a position selected from the alpha and gamma positions in the presence of an alkaline condensing agent.

12. A process for preparing merocarbocyanine dyes containing the 5,6,7,8-tetrahydro-4-cycloheptathiazole nucleus and having the formula

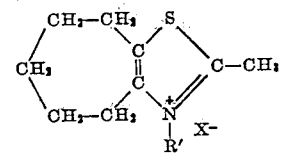

wherein R is a member selected from the group consisting of alkyl and aralkyl groups, R' is a member selected from the group consisting of alkyl, aralkyl, and aryl groups, L is a methine group, $n$ is a positive integer of from 1 to 4 and Q is a member selected from the group consisting of oxygen, sulfur, selenium and =N-R' comprising condensing in an alkaline medium a quaternary salt having the general formula

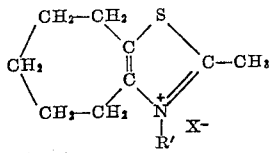

wherein R' represents a member selected from the group consisting of alkyl and aralkyl groups and X⁻ represents an anion with a ketomethylene heterocyclic compound having a reactive arylaminoethylene group in the 5 position in an alkaline medium.

13. A process for preparing styryl dyes containing the 5,6,7,8-tetrahydro-4-cycloheptathiazole nucleus and having the formula

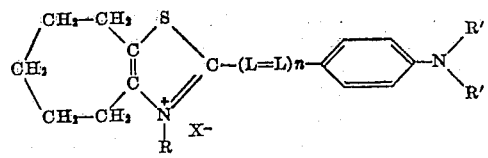

where R and R' represent a member selected from the group consisting of alkyl and aralkyl groups, L represents a methine group, $n$ is a positive integer from 1 to 2 and X⁻ represents an acid radical comprising condensing a quaternary salt having the general formula

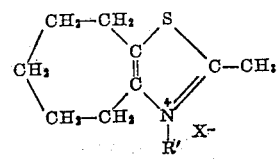

wherein R' represents a member selected from the group consisting of alkyl and aralkyl groups and X⁻ represents an acid radical with p-dialkyl aminobenzaldehyde in the presence of an alkaline catalyst.

References Cited in the file of this patent

UNITED STATES PATENTS

| Number | Name | Date |
|---|---|---|
| 1,970,656 | Johnson | Aug. 21, 1934 |
| 2,020,650 | Johnson | Nov. 12, 1935 |
| 2,170,803 | Brooker | Aug. 29, 1939 |
| 2,170,804 | Brooker | Aug. 29, 1939 |
| 2,170,805 | Brooker | Aug. 29, 1939 |
| 2,316,250 | Jones | Apr. 13, 1943 |
| 2,336,463 | Brooker et al. | Dec. 14, 1943 |
| 2,336,843 | Brooker et al. | Dec. 14, 1943 |
| 2,342,546 | Kendall | Feb. 22, 1944 |

OTHER REFERENCES

Chemical Abstracts, 16, 3101. (Copy in S. L.) Abstract of Brit. Med. Journal, 1922, I, 514–5.

Chemical Abstracts, 19, 530. (Copy in S. L.) Abstract of Proc. Roy. Soc., London, 96B, 317–333, 1924.

Clerc: "Photography Theory and Practice," 3rd Ed., page 151, Pitman Pub. Corp., N.Y., 1942. (Copy in Div. 60.)